United States Patent [19]

Moore

[11] Patent Number: 4,457,590

[45] Date of Patent: Jul. 3, 1984

[54] SPHERICAL GRADIENT-INDEX LENS DESIGNS FOR VIDEO-DISK PICKUP LENS OR THE LIKE

[75] Inventor: Duncan T. Moore, Rochester, N.Y.

[73] Assignee: Corning Glass Works, Corning, N.Y.

[21] Appl. No.: 338,477

[22] Filed: Jan. 11, 1982

[51] Int. Cl.³ .............................................. G02B 3/00
[52] U.S. Cl. ................................................. 350/413
[58] Field of Search ......................................... 350/413

[56] References Cited

U.S. PATENT DOCUMENTS 3,729,253  4/1973  Moore et al. ................. 350/413

Primary Examiner—John K. Corbin
Assistant Examiner—Rebecca D. Gass
Attorney, Agent, or Firm—K. van der Sterre

[57] ABSTRACT

Spherical singlet lenses of gradient index design, suitable for use as video disk lenses or the like, are provided wherein all orders of spherical abberation are sufficiently reduced to provide diffraction-limited axial imaging. This imaging is achieved without resorting to sixth-order refractive index profile control; only the profile parameters $N_{00}$, $N_{10}$ and $N_{20}$ defining the radial index profile N(r) in the profile function:

$$N(r) = N_{00} + N_{10}r^2 + N_{20}r^4$$

together with the surface curvatures and thickness of the lens, are used to control lens properties.

6 Claims, 1 Drawing Figure

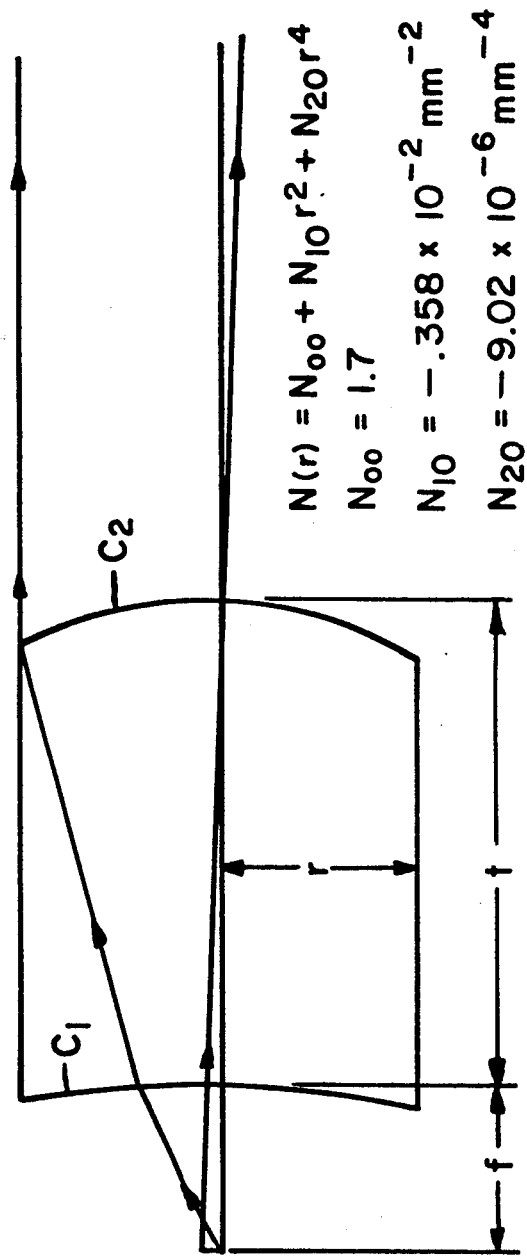

SPHERICAL GRADIENT-INDEX LENS DESIGNS FOR VIDEO-DISK PICKUP LENS OR THE LIKE

BACKGROUND OF THE INVENTION

The present invention is in the field of graded-index optics and particularly relates to a singlet graded-index lens useful as a microscopic objective for video-disk lens pickup systems or the like. For applications such as video-disk lenses, it is important that the lens exhibit very low monochromatic aberrations, particularly low spherical aberration, while at the same time being inexpensive. While multi-element and aspheric lenses have been considered for this application, a spherical singlet lens exhibiting the required low aberration could be much more economical to produce.

Graded-index lens designs have been proposed which reduce third-order aberrations. For example, U.S. Pat. No. 3,729,253 to Moore et al. describes spherical lenses with radial refractive index gradients which exhibit reduced third-order spherical aberration, coma and astigmatism. These lenses can be used with an appropriately placed stop to provide an optical system wherein third-order distortion is also reduced. However, the lenses specifically described by Moore et al. are not suitable for video-disk lenses because of their excessively high fifth-order spherical aberration which seriously degrades the axial imaging characteristics of the lens. For video-disk applications, all orders of spherical aberration must be near zero to obtain essentially defraction-limited axial imaging capability.

K. Kikuchi et al., *Applied Optics*, 19(7), 1076–1080, describe lens designs for video-disk applications with reduced spherical aberrations. However, their solution requires adjustment of the refractive index profile of the lens to a very high degree. As is known, the refractive index profile of a gradient index medium wherein the gradient is radial, i.e., varies with distance from an optical axis through the medium can be defined by a power series expansion in radius r as follows:

$$N(r) = N_{00} + N_{10}r^2 + N_{20}r^4 + N_{30}r^6 \ldots$$

wherein N(r) is the refractive index of the medium at radius r from the optical axis and $N_{00}$, $N_{10}$, $N_{20}$ and $N_{30}$ are the zeroth-, second-, fourth-, and sixth-order coefficients of the power terms. In accordance with Kikuchi et al. the correction of spherical aberration to obtain improved axial imaging requires control of the sixth-order coefficient $N_{30}$ of the power series expansion defining the refractive index profile of the medium. This degree of control over the refractive index profile is difficult to attain.

It is therefore a principal object of the present invention to provide designs for video-disk lenses or the like wherein reduced spherical aberration is obtained without the need for such critical index profile control.

Other objects and advantages of the invention will become apparent from the following description thereof.

SUMMARY OF THE INVENTION

The present invention is founded on the discovery of a family of lens designs wherein third- and higher-order spherical aberrations can be adjusted substantially to zero without the need for sixth-order refractive index profile control. Within this family of lens designs are lenses exhibiting focal length, numerical aperture, and full-field focusing characteristics within the range of properties required for video-disk lenses or the like.

More particularly described, the lenses provided in accordance with the invention are spherical singlet lenses, having first and second refracting surfaces with spherical curvatures $C_1$ and $C_2$, respectively, and a graded radial refractive index profile wherein the refractive index N of the lens varies with radial distance r from the optical axis of the lens approximately according to the power series expansion formula:

$$N(r) = N_{00} = N_{10}r^2 + N_{20}r^4$$

The third-order spherical aberration of the lens is approximately zero, being reduced by selective adjustment of the power series coefficient $N_{20}$ above, and the third-order coma of the lens is also adjusted to approximately zero by adjusting the curvature $C_1$ of the first refracting surface. Unexpectedly, fifth- and higher-order spherical aberrations in the lens may then be reduced to nearly zero, i.e., so that the lens exhibits an axial spot size which is substantially diffraction-limited, by selective adjustments to the power series coefficient $N_{10}$ and the curvature of the second refracting surface $C_2$ without further index profile control. This can be accomplished while maintaining the focal length of the lens at the value selected for the video-disk objective.

For video-disk applications, it is desirable that the lens or lens system have a focal length f not exceeding about 20 mm, preferably about 2–10 mm, and a numerical aperture of at least about 0.1, preferably about 0.30–0.45. Lenses exhibiting these characteristics can readily be obtained in accordance with the invention while still maintaining the rms optical path difference at values of $\lambda/2$ or below across the entire field of the lens, and at values of $\lambda/13$ or below at field heights of 0.7 and below. Further, as above noted, the near-axis rms optical path difference (the path difference on and near the optical axis) can be reduced for the preferred designs to values approaching $\lambda/18$, as evidenced by the fact that the computed size of the on-axis image of a point source is equal to or less than the minimum spot size due to diffraction. Such lenses provide essentially diffraction limited oxide imaging capability.

BRIEF DESCRIPTION OF THE DRAWING

The invention may be further understood by reference to the drawing schematically illustrating a preferred configuration for a lens of the type obtainable in accordance therewith.

DETAILED DESCRIPTION

Third-order aberration theory is based on the difference in image plane coordinates between the desired or ideal ray coordinates and the coordinates of the actual ray corresponding thereto. The image coordinates of the actual ray are determined by experiment or by ray tracing computations. The five types of third-order aberrations have magnitudes defined by the coefficients $\sigma_n$ in the known equations relating these differences to the location and direction in the entrance pupil of the ray to be traced. These third-order coefficients are usually designated as follows:

$\sigma_1$ = spherical aberration
$\sigma_2$ = coma
$\sigma_3$ = astigmatism
$\sigma_4$ = Petzval curvature of field
$\sigma_5$ = distortion These aberrations have been analyzed for gradient index media by P. J. Sands in *Jour. Opt. Soc. Am.*, 60(11), pp. 1436–1443 (November 1970).

The ray tracing techniques of the prior art, as outlined in U.S. Pat. No. 3,729,253, are used to compute the expected performance characteristics of a particular candidate lens design. The differential equation describing the paths of paraxial rays in a medium with a radial refractive index gradient is known and has been solved for the case of a profile defined by the power series expansion formula above, using the known expression for the paraxial ray height of two representative paraxial rays in a lens system. See D. T. Moore, *Jour. Opt. Soc. Am.*, 61(7), pp. 886–894 (July 1971) and *Jour. Opt. Soc. Am.*, 65(3), pp. 451–5 (April 1975).

Using the ray tracing approach, the paths of non-ideal rays through a lens system can be computed for a given candidate design and the deviation of those rays from ideal paths ascertained. Knowing this deviation, one can calculate the values of the aberration coefficients $\sigma_1$–$\sigma_5$ and determine whether a particular change has reduced or increased a particular coefficient. Further design modifications are then made to approach the aberration characteristics which are desired. For a further discussion of these ray tracing techniques and their adaptation to the design of optical systems, reference may be made to the aforementioned literature and the references cited therein.

The focal length of a spherical lens with a radially-graded refractive index profile is determined not only by the curvature of the spherical surfaces, but also by the refractive index gradient, particularly the value of the coefficient $N_{10}$ in the above index distribution expansion. Thus, for a given lens, many different curvature/profile combinations can be used to achieve a selected focal length value.

To arrive at a particular lens design, a useful approach is to fix the thickness of the lens of a suitable value, and then to set a curvature and $N_{10}$ profile coefficient which will give a selected focal length. In actuality, only one of the curved surfaces needs to be used for focal length control and the back surface curvature $C_2$, which is the surface away from the object plane of the system, is arbitrarily selected for this use.

Recognizing that focal length control can be maintained for a given value of $N_{10}$ by controlling curvature $C_2$, the curvature of the first surface $C_1$, the surface closest to the object plane, is then varied to correct the coma ($\sigma_2$) in the lens, with various trials being conducted until a value of approximately zero for coma is obtained. The value of $C_2$ is changed during the trials as needed to maintain the focal length at the selected value.

The fourth-order refractive index profile coefficient $N_{20}$ is the variable used to correct third-order spherical aberration ($\sigma_1$) in the lens. Again, various values of $N_{20}$ are tried to reduce spherical aberration, and the trials are repeated until a value of approximately zero for $\sigma_1$ is obtained. During these trials, $C_1$ and $C_2$ are varied as necessary to maintain the focal length of the lens at the selected value and to maintain coma correction.

Although not as important as third-order coma and third-order spherical aberration, third-order astigmatism and curvature of field are also aberrations of interest in this system. Since, as already noted, the focal length of the lens can be maintained at a fixed value using one of the curved surfaces, i.e., $C_2$, it is possible to vary $N_{10}$ while maintaining the focal length to evaluate the effect of profile alterations on these other third-order aberrations.

Table 1 below records the effects of changes in $N_{10}$ on third-order astigmatism ($\sigma_3$) and third-order field curvature ($\sigma_4$) in a system such as described. The data given in Table 1 are for the case of a lens having a thickness of 8.87 mm, a numerical aperture of 0.45, and an on-axis refractive index value of 1.5. Included in Table 1 are values for the second-order refractive index distribution coefficient $N_{10}$, the value of the coefficient $N_{20}$ needed to maintain zero third-order spherical aberration ($\sigma_1 = 0$), the value of $C_1$ needed for full coma correction ($\sigma_2 = 0$), and the value of $C_2$ needed to maintain the focal length of the lens at about 8 mm. The values of astigmatism ($\sigma_3$) and field curvature ($\sigma_4$), as well as the radius of the axial spot formed by the lens, are reported for each of the designs.

Table 1 demonstrates not only that variations is $N_{10}$ can effect third-order astigmatism and field curvature, but also that designs with zero third-order spherical aberration and coma exist wherein the axial spot size is zero. This means that non-third-order spherical aberration in the lens, particularly fifth-order spherical aberration, has also been reduced to zero. The fact that this can be accomplished without resort to sixth-order refractive index profile control could not have been predicted.

TABLE 1

| $N_{10}$ ($\times 10^2$) (mm$^{-2}$) | $N_{20}$ ($\times 10^4$) (mm$^{-4}$) | $C_1$ (mm$^{-1}$) | $C_2$ (mm$^{-1}$) | $\sigma_3$ ($\mu$m) | $\sigma_4$ ($\mu$m) | Axial Spot Radius ($\mu$m) |
|---|---|---|---|---|---|---|
| −0.36 | −0.0347 | 0.13673 | −0.0434 | −0.90 | −2.5 | −15.9 |
| −0.39 | −0.0963 | 0.136471 | −0.0288 | −1.06 | −2.4 | −4.76 |
| −0.396 | −0.1075 | 0.136227 | −0.026155 | −1.08 | −2.4 | 0.0 |
| −0.398 | −0.11115 | 0.136123 | −0.02529 | −1.09 | −2.4 | +0.79 |
| −0.40 | −0.11479 | 0.13590 | −0.02448 | −1.10 | −2.4 | +1.46 |

It may be noted that the foregoing designs were carried out selecting a lens thickness of 8.87 mm. In fact, it is quite possible to select other thicknesses and to then develop other lens designs within the scope of the invention which will also exhibit zero third-order spherical aberration and coma. Tables 2 and 3 below set forth lens designs for lens thicknesses of 10 and 12 mm, respectively. Again, the focal length of the lenses has been maintained at about 8 mm, the spherical aperture at 0.45 and the axial refractive index at 1.5.

As in the case of Table 1 above, adjustment of the $N_{10}$ refractive index profile coefficient has resulted in changes in values of third-order astigmatism ($\sigma_3$) and field of curvature ($\sigma_4$) particularly illustrating that reduction in astigmatism may be obtained. More importantly, however, the data indicate that configurations exist at these higher thicknesses wherein zero axial spot size, and thus substantially zero third- and fifth-order spherical aberration, may be achieved while still maintaining coma correction and the first-order properties of the lenses.

TABLE 2

| $N_{10} (\times 10^2)$ (mm$^{-2}$) | $N_{20} (\times 10^4)$ (mm$^{-4}$) | $C_1$ (mm$^{-1}$) | $C_2$ (mm$^{-1}$) | $\sigma_3$ (μm) | $\sigma_4$ (μm) | Axial Spot Radius (μm) |
|---|---|---|---|---|---|---|
| −0.38 | −0.06717 | 0.1213 | −0.0470 | −0.68 | −2.56 | −8.4 |
| −0.40 | −0.1069 | 0.1225 | −0.0335 | −0.82 | −2.50 | −0.7 |
| −0.402 | −0.1080 | 0.1219 | −0.0332 | −0.82 | −2.50 | −0.2 |
| −0.41 | −0.1235 | 0.1224 | −0.0276 | −0.82 | −2.46 | +2.5 |

TABLE 3

| $N_{10} (\times 10^2)$ (mm$^{-2}$) | $N_{20} (\times 10^4)$ (mm$^{-4}$) | $C_1$ (mm$^{-1}$) | $C_2$ (mm$^{-1}$) | $\sigma_3$ (μm) | $\sigma_4$ (μm) | Axial Spot Radius (μm) |
|---|---|---|---|---|---|---|
| −0.30 | −0.0427 | 0.1096 | −0.1093 | −0.4 | −2.99 | −45 |
| −0.34 | −0.02478 | 0.1085 | −0.0848 | −0.4 | −2.87 | −23 |
| −0.36 | −0.0209 | 0.09928 | −0.0816 | −0.3 | −2.81 | −22 |
| −0.35 | −0.0194 | 0.0919 | −0.0762 | −0.3 | −2.75 | −20 |
| −0.40 | −0.0555 | 0.0939 | −0.0603 | −0.36 | −2.68 | −11.4 |
| −0.42 | −0.0961 | 0.0972 | −0.0411 | −0.50 | −2.59 | −4.4 |
| −0.43 | −0.1137 | 0.0983 | −0.0313 | −0.57 | −2.54 | −1.6 |
| −0.44 | −0.1298 | 0.0991 | −0.0215 | −0.65 | −2.48 | +0.6 |

The only degree of freedom in the lens design which has not yet been discussed for its effect on aberration is the axial refractive index, $N_{00}$, which was maintained at a value of 1.5 in previous designs. In Tables 4 and 5 below, lens designs have been developed for a base index value of 1.7, and again third-order spherical aberration and third-order coma have been reduced to zero. In Table 4, a lens thickness of 8.9 mm was selected, while in Table 5, the thickness was set at 12.0 mm. Again, lens designs wherein the axial spot size was substantially zero could be derived.

coma could not readily be eliminated by variations in the index profile coefficients $N_{10}$ and $N_{20}$ and the surface curvatures of the lenses.

A specific example of a lens which could be provided in accordance with the invention is shown in the Drawing. The Drawing is a schematic illustration in cross-section of a lens such as reported in Table 4, corresponding to the fifth table entry with a front surface curvature $C_1$ of 0.134591 and a back surface curvature $C_2$ of about 0.045533 mm$^{-1}$. The base or on-axis refractive index of the lens, which corresponds in value to the

TABLE 4

| $N_{10} (\times 10^2)$ (mm$^{-2}$) | $N_{20} (\times 10^4)$ (mm$^{-4}$) | $C_1$ (mm$^{-1}$) | $C_2$ (mm$^{-1}$) | $\sigma_3$ (μm) | $\sigma_4$ (μm) | Axial Spot Radius (μm) |
|---|---|---|---|---|---|---|
| −0.45 | −0.2207 | 0.12919 | 0.075926 | −2.6 | −1.4 | +18 |
| −0.4 | −0.1533 | 0.132130 | 0.059163 | −2.3 | −1.5 | +9 |
| −0.37 | −0.1088 | 0.133759 | 0.049063 | −2.2 | −1.6 | +2.7 |
| −0.36 | −0.093167 | 0.134216 | 0.045538 | −2.2 | −1.7 | +0.3 |
| −0.358 | −0.090199 | 0.134591 | 0.045533 | −2.2 | −1.7 | +0.1 |
| −0.35 | −0.077013 | 0.134505 | 0.041636 | −2.1 | −1.7 | −2 |

TABLE 5

| $N_{10} (\times 10^2)$ (mm$^{-2}$) | $N_{20} (\times 10^4)$ (mm$^{-4}$) | $C_1$ (mm$^{-1}$) | $C_2$ (mm$^{-1}$) | $\sigma_3$ (μm) | $\sigma_4$ (μm) | Axial Spot Radius (μm) |
|---|---|---|---|---|---|---|
| −0.40 | −0.1588 | 0.1103 | 0.0787 | −1.8 | −1.3 | +9.4 |
| −0.38 | −0.1318 | 0.10922 | 0.0546 | −1.6 | −1.5 | +6.5 |
| −0.36 | −0.1124 | 0.11029 | 0.0406 | −1.4 | −1.7 | +3.4 |
| −0.345 | −0.09134 | 0.1101 | 0.0273 | −1.3 | −1.8 | +1.9 |
| −0.342 | −0.0873 | 0.1100 | 0.0247 | −1.3 | −1.8 | +1.4 |
| −0.34 | −0.07080 | 0.1053 | 0.00986 | −1.1 | −1.9 | −1.4 |

Another factor to be noted in the lens designs utilizing a higher base index is the reduction in third-order field curvature which has been obtained. Although this resulted in an increase in third-order astigmatism, this aberration could be somewhat reduced by going to the higher thickness of 12.0 mm.

In reviewing the effects of various parameters on lens characteristics, it was generally found that increasing the base index tended to reduce the amount of index change necessary for correction. Hence, for a base index of 1.5, the change of index required was 0.051, while for a base index of 1.7 the change of index needed was only 0.046. It also appeared that the higher base index somewhat reduced third-order astigmatism. Most importantly, however, no designs were found within the thickness and base index ranges above described wherein third- and fifth-order spherical aberration and profile coefficient $N_{00}$, is about 1.7, and the lens has a thickness t of about 8.87 mm. The lens has a numerical aperture NA of 0.45 and a focal length f of about 8 mm. The value of the profile coefficient $N_{10}$ is $-0.358 \times 10^{-2}$ mm$^{-2}$ and the value of the profile coefficient $N_{20}$ is $-0.090199 \times 10^{-4}$ mm$^{-4}$, providing substantially zero third- and fifth-order spherical aberration as evidenced by an axial spot radius of 0.1 μm, which is well below the radius of the diffraction spot and corresponds to an rms optical path difference of λ/18. As with all lenses provided in accordance with the invention, sixth-order index profile control is not required, so that the value of the profile coefficient $N_{30}$ is zero.

Of course the foregoing design is merely exemplary of designs which could be provided in accordance with the invention above described. Based on data such as presented in the foregoing description, configurations for lenses for video-disk applications may be defined wherein the lens parameters $C_1$, $C_2$, $N_{00}$, $N_{10}$, $N_{20}$, and t fall within the following limitations:

$0.09 \leq C_1 \leq 0.14$ mm$^{-1}$ $-0.04 \leq C_2 \leq 0.05$ mm$^{-1}$ $8 \leq t \leq 15$ mm $1.35 \leq N_{00} \leq 1.9$ $-0.0045 \leq N_{10} \leq -0.0030$ mm$^{-2}$ $-1 \times 10^{-4} \leq N_{20} \leq -1 \times 10^{-7}$ mm$^{-4}$

I claim:

1. A singlet lens having a thickness t and including opposing first and second refracting surfaces having spherical curvatures $C_1$ and $C_2$, respectively, and a radial refractive index gradient wherein the refractive index N of the lens varies with radial distance r from the optical axis of the lens approximately according to the power series expansion formula:

$$N(r) = N_{00} + N_{10}r^2 + N_{20}r^4$$

wherein the lens parameters $C_1$, $C_2$, t, $N_{00}$, $N_{10}$ and $N_{20}$ are within the following ranges:

$0.09 \leq C_1 \leq 0.14$ mm$^{-1}$ $-0.04 \leq C_2 \leq 0.05$ mm$^{-1}$ $8 \leq t \leq 15$ mm $1.35 \leq N_{00} \leq 1.9$ $-0.0045 \leq N_{10} \leq -0.0030$ mm$^{-2}$ $-1 \times 10^{-4} \leq N_{20} \leq -1 \times 10^{-7}$ mm$^{-4}$ 2. A lens in accordance with claim 1 wherein the parameters have approximately the following values: $C_1 = 0.135227$ mm$^{-1}$, $C_2 = -0.026155$ mm$^{-1}$, $t = 8.87$ mm, $N_{00} = 1.5$, $N_{10} = -0.00396$ mm$^{-2}$, and $N_{20} = -0.1075 \times 10^{-4}$ mm$^{-4}$.

3. A lens in accordance with claim 1 wherein the parameters have approximately the following values: $C_1 = 0.1219$ mm$^{-1}$, $C_2 = -0.0332$ mm$^{-2}$, $t = 10$ mm, $N_{00} = 1.5$, $N_{10} = -0.00402$ mm$^{-2}$, and $N_{20} = -0.1080 \times 10^{-4}$ mm$^{-4}$.

4. A lens in accordance with claim 1 wherein the parameters have approximately the following values: $C_1 = 0.0991$ mm$^{-1}$, $C_2 = -0.0215$ mm$^{-1}$, $t = 12$ mm, $N_{00} = 1.5$, $N_{10} = -0.0044$ mm$^{-2}$, and $N_{20} = -0.1298 \times 10^{-4}$ mm$^{-4}$.

5. A lens in accordance with claim 1 wherein the parameters have approximately the following values: $C_1 = 0.134591$ mm$^1$, $C_2 = 0.045533$ mm$^{-1}$, $t = 8.9$ mm, $N_{00} = 1.7$, $N_{10} = -0.00358$ mm$^{-2}$, and $N_{20} = -0.090199 \times 10^{-4}$ mm$^{-4}$.

6. A lens in accordance with claim 1 wherein the parameters have approximately the following values: $C_1 = 0.1100$ mm$^{-1}$, $C_2 = -0.00247$ mm$^{-1}$, $t = 12$ mm, $N_{00} = 1.7$, $N_{10} = -0.00342$ mm$^{-2}$, and $N_{20} = -0.0873 \times 10^{-4}$ mm$^{-4}$.

* * * * *

UNITED STATES PATENT AND TRADEMARK OFFICE
CERTIFICATE OF CORRECTION

PATENT NO. : 4,457,590
DATED : July 3, 1984
INVENTOR(S) : Duncan T. Moore

It is certified that error appears in the above-identified patent and that said Letters Patent is hereby corrected as shown below:

Column 3, line 48, change "of" to --at--.

Column 3, line 58, change "the" (second occurrence) to --for--.

Column 4, line 28, change "is" to --in--.

Column 4, line 29, change "effect" to --affect--.

Column 8, line 9, change "$-0.135227mm^{-1}$" to -- $-0.136227mm^{-1}$ --.

Column 8, line 14, change "$-0.0332mm^{-2}$" to -- $-0.0332mm^{-1}$ --.

Column 8, line 25, change "$0.134591mm^{1}$" to -- $0.134591mm^{-1}$ --.

Signed and Sealed this

Nineteenth Day of March 1985

[SEAL]

Attest:

DONALD J. QUIGG

Attesting Officer    Acting Commissioner of Patents and Trademarks